United States Patent [19]
Nishida

[11] Patent Number: 4,972,288
[45] Date of Patent: Nov. 20, 1990

[54] TAPE REMAINING TIME DISPLAY SYSTEM

[75] Inventor: Yoshihiro Nishida, Nagaokakyo, Japan

[73] Assignee: Mitsubishi Denki Kabushiki Kaisha, Tokyo, Japan

[21] Appl. No.: 273,336

[22] Filed: Nov. 10, 1988

[30] Foreign Application Priority Data

Mar. 13, 1987 [JP] Japan ................................. 62-59534

[51] Int. Cl.$^5$ ............................................. G11B 15/00
[52] U.S. Cl. ..................................................... 360/137
[58] Field of Search ......................................... 360/137

[56]  References Cited
U.S. PATENT DOCUMENTS 4,532,560  7/1985  Williams .............................. 360/137

FOREIGN PATENT DOCUMENTS 59-207077  11/1984  Japan .
60-13378   1/1985   Japan .
60-52989   3/1985   Japan .

Primary Examiner—Robert S. Tupper

[57] ABSTRACT

A tape remaining time display method and system is provided for displaying the length of the remaining tape in terms of the length of time. The length of remaining tape is directly or indirectly calculated from a detected cycle for the rotation of the tape supply-side reel. A digital filtering process is performed on the value calculated directly or indirectly from the detected cycle of rotation for the supply-side reel in order to provide a highly accurate tape remaining time display system.

5 Claims, 4 Drawing Sheets

TAPE REMAINING TIME DISPLAY SYSTEM

FIELD OF TECHNOLOGY

The present invention relates to a tape remaining time display system and method for displaying the length of the remaining tape in terms of a length of time by detecting the cycle of rotation of a tape supply-side reel and then performing a predetermined calculation on the basis of the detected cycle of rotation.

BACKGROUND ART

The conventional tape remaining time display system generally employs a system which performs a calculation for each predetermined number of rotations of a supply-side reel in response to a pulse output from the reel during a constant speed travel of a length of tape, for example. Thereby, the current length of time of the length of the remaining tape is successively calculated and displayed.

During recording or reproduction, the cycle of the reel varies depending on the amount of turns for the length of tape around a reel. The extent of such variations is a few second, for example, 6 seconds at the start of the winding and 3 seconds at the end of the winding. If the calculation is performed for each rotation of the reel having such a cycle, the length of time which is descriptive of the length of the remaining tape can be calculated in the order of a few seconds.

The length of time which is descriptive of the remaining length of tape employs a system wherein the display is updated each time the calculation is performed.

Accordingly, the relationship of the calculated value and the displayed value of both of the length of time, which is descriptive of the remaining length of tape and the displayed value relative to the passage of time, is illustrated in FIG. 5.

Referring to FIG. 5, assuming that the length of time descriptive of the remaining length of tape calculated at, for example, the timing t1 is expressed by C1, the value thereof is continuously displayed up until the timing t2 as illustrated by the single-dotted chain line or only the display is varied as illustrated by the solid line. If the length of time descriptive of the remaining length of tape calculated at the timing t2 is expressed by C2, the value thereof is displayed as illustrated by the single-dotted line or the solid line in a manner similar to that described above. Thereafter, the length of time which is descriptive of the remaining length of tape is similarly displayed. It is to be noted that the timings t1, t2 . . . are employed in the form of the timing for each rotation of the reel.

Because the conventional tape remaining time display system is so constructed as hereinabove described, the result of the calculation is adversely affected by fluctuations in the tape winding when the length of the tape is tightly wound or loosely wound. For example, fluctuations in the rotation of the reel such as woof and flutter, and errors in the measurement of the reel rotation cycle tend to be displayed. Therefore, there is a problem when an error is relatively large and a discontinuity tends to occur in the display of the length of time, which is descriptive of the remaining length of tape, in such a way that the display of the length of time, which is descriptive of the remaining length of tape, may jump back and forth.

SUMMARY OF THE INVENTION

The present invention is directed to substantially alleviating the above described problem and provides for its object a tape remaining time display system having a length of time which is descriptive of the remaining length of tape from time to time being accurately confirmed. Thereby, the length of time, which is descriptive of the remaining length of tape, can be precisely displayed by minimizing the error in the display of the length of time which is descriptive of the remaining length of tape which may otherwise result from the fluctuations in the tape winding and the reel rotation.

The tape remaining time display system according to an embodiment of the present invention directly calculates the length of time which is descriptive of the remaining length of tape from the reel rotation cycle or indirectly calculates the value from the reel rotation cycle which is subjected to a digital filtering process.

According to an embodiment of the present invention, by subjecting the digital filtering process to the value obtained each time the calculation is performed, the correlation between the newly calculated value and the previously calculated value can be obtained. Therefore, it is possible to avoid the situation in which errors in the measurement of the reel rotation cycle may affect the display of the length of time which is descriptive of the remaining length of tape.

According to an embodiment of the present invention, by subjecting the digital filtering process to the calculated value of the length of time, which is descriptive of the remaining length of tape, the correlation between the newly calculated value and the previously calculated value can be obtained. Therefore, the display of the length of time, which is descriptive of the remaining length of tape, can be highly precise without being adversely affected by the fluctuation in the rotation of the reel and the error in the rotation cycle.

BRIEF DESCRIPTION OF THE DRAWINGS

The present invention will become more fully understood from the detailed description given hereinbelow and the accompanying drawings which are given by way of illustration only, and thus, are not limitative of the present invention, and wherein.

DETAILED DESCRIPTION OF THE PREFERRED EMBODIMENTS

Hereinafter, an embodiment of the present invention will be described with reference to the accompanying drawings. This embodiment will be described as designed so that the length of time, which is descriptive of the remaining length of tape, is calculated from the number of pulses representative of the length of remaining tape on the reel. The number of pulses are calculated from the cycle of rotation of the supply-side reel.

Figure 1:
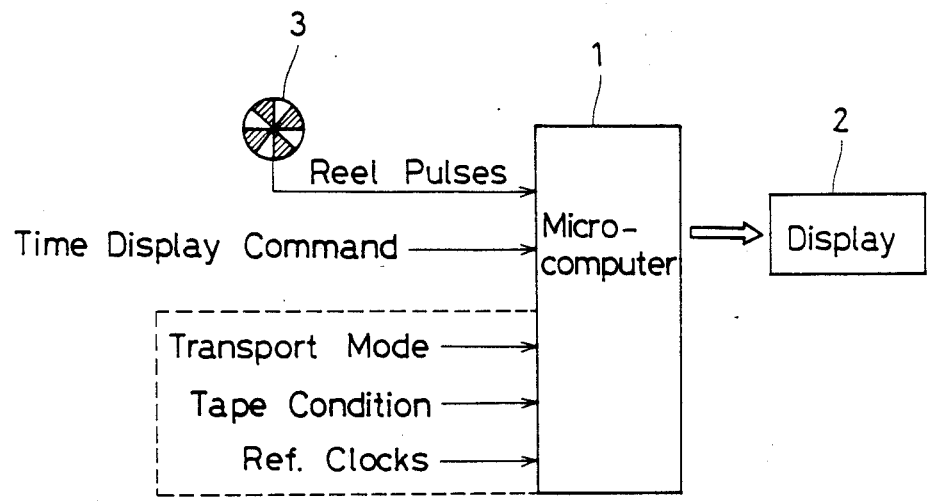
FIG. 1 is a block diagram of a tape remaining time display system according to one embodiment of the present invention.

FIG. 1 is a block diagram illustrating the tape remaining time display system according to one embodiment of the present invention. Referring to FIG. 1, a microcomputer 1 is adapted to be inputted with reel pulses that are outputted by the rotation of a supply-side reel 3. The microcomputer 1 is operable to cause a display unit 2 to display tape conditions such as whether or not the tape is injected because the tape is loaded, a tape transport mode for displaying whether the tape is transported at a constant speed or a fast speed, and the remaining length of tape for displaying when a tape remaining time display command is inputted while either of the reference clocks that are used in the measurement of the cycle of the rotation of the reel have been stored as internal data or the reference clocks are inputted each time the tape is used. In the event that the measurement of the remaining length of the tape is impossible, a display is provided to indicate such an effect.

Figure 3:
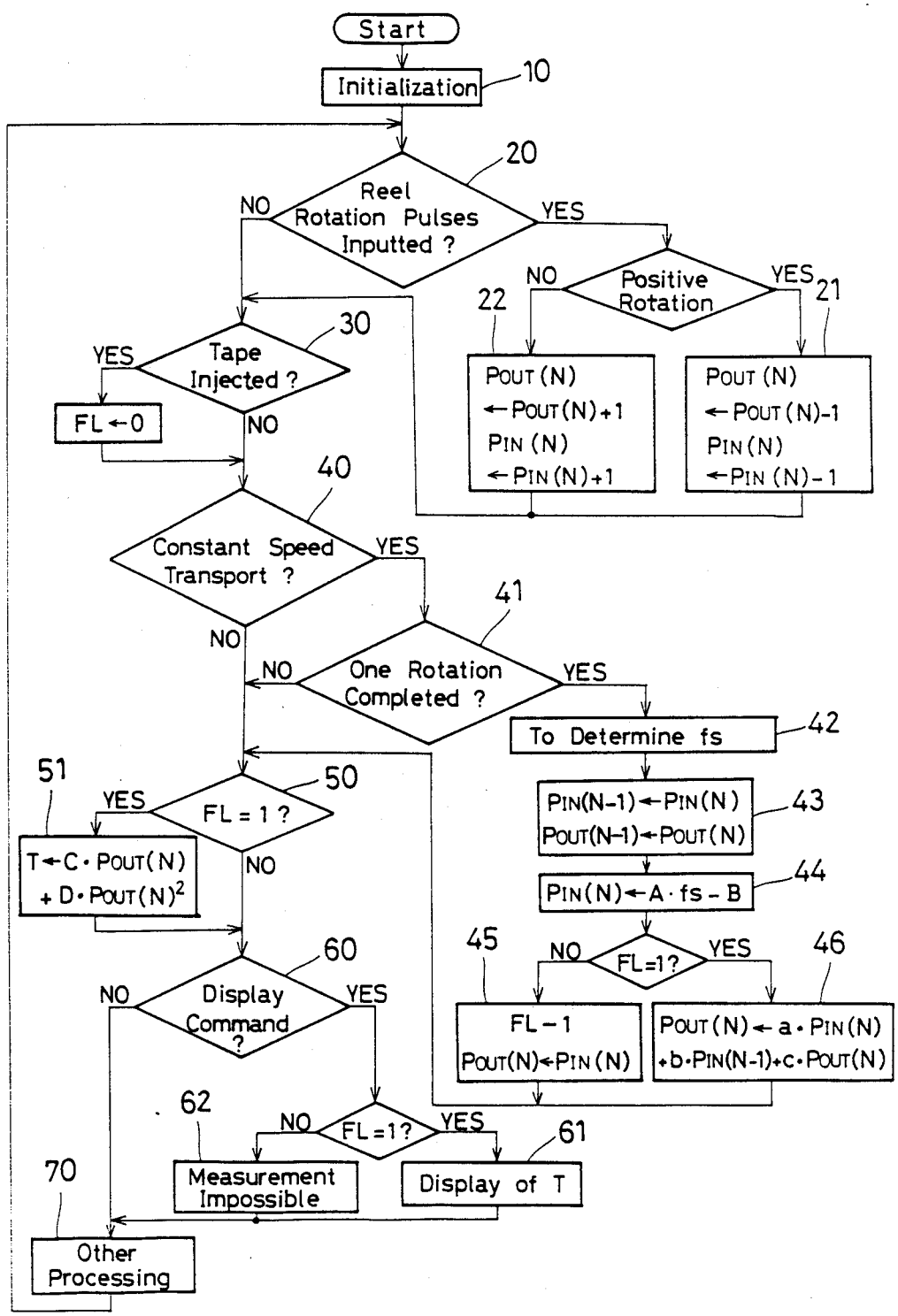
FIG. 3 is a flowchart of a process that is programmed in the microcomputer illustrated in FIG. 1.

The microcomputer 1 referred to above includes an arithmetic unit, a random access memory, a read-only memory and other components. The random access memory of the microcomputer 1 is provided with various data areas such as a flag FL, which is representative of the capability of the measurement of the length of time and is descriptive of the remaining length of the tape. The number Pin(N) of the pulses, which is representative of the length of the tape remaining on the reel, are calculated from the cycle fs for the rotation of the reel before the passage through a filter, and the number Pout(N) of the pulses, which is representative of the length of tape remaining on the reel, are calculated after the passage through the filter. Also provided are Pin(N−1) and Pout(N−1) for the storage of the numbers Pin(N) and Pout(N) of the pulses, which are representative of the length of tape remaining on the reel and was previously calculated for use in the calculation of the filter, and the tape remaining time T, which is calculated from the reel remaining pulse number Pout(N) after the passage through the filter. The read-only memory of the microcomputer is stored with a program for executing such a process as illustrated in the flowchart of FIG. 3.

The operation of the above described construction will now be described by referring to the flowchart of FIG. 3.

When the system is reset, the program starts from an initialization process step (1). Thereafter, a loop circulates from a process step (20) to a process step (70).

The step (10) is an initializing process during which the random access memory is cleared so that input and output settings may be performed.

A step (20) constantly detects the rotation of the supply-side reel and shifts the numbers Pin(N) and Pout(N) of the pulses up and down which are representative of the length of tape remaining on the reel according to the rotation of the reel. In the even that the reel is rotated in a positive direction, Pin(N) and Pout(N) are counted down at step (21) for each pulse. In the event that the reel is rotated in a reverse direction, Pin(N) and Pout(N) are counted at a step (22) for each pulse.

A step (30) detects when the tape is removed and sets the flag FL to "0". At this time, the number Pout(N) for the pulses, which is indicative of the length of tape remaining on the reel, is not the correct number of pulses for indicating the length of tape remaining on the reel.

A step (40) calculates the number Pout(N) for the pulses, which is indicative of the length of tape remaining on the reel, during a constant speed transportation. A decision is made at a step (41) on whether or not the supply-side reel has completed one rotation during the constant speed transportation. If the supply-side reel has not yet completed one rotation, the program proceeds to the next subsequent step (50). In the event that the reel has completed one rotation during the constant speed transportation, the cycle fs of one rotation is determined at a step (42). At a step (43), the Pin(N) and Pout(N), which represent the respective results of the previous calculations are retracted to Pin(N−1) and Pout(N−1). A step (44) follows so that Pin(N), which is representative of a result of a current calculation, is calculated from fs determined at the step (42) with the use of the following equation:

$$Pin(N) = A \cdot fs - B \qquad (1).$$

It is to be noted that A and B represent a constant calculated in consideration of the thickness of the tape, the hub diameter of the reel, the tape transport speed, etc.

If at this time the flag FL is "0", the current calculation is the first calculation of the number Pout(N) which is descriptive of the length of tape remaining on the reel. Since the current number Pout(N) of pulses indicative of the length of tape remaining on the reel does not reflect the correct number of the pulses indicative of the length of tape remaining on the reel, the number Pin(N) of the pulses indicative of the length of tape remaining on the reel calculated at the step (44) is rendered at a step (45) to be Pout(N) in the form as presented. Simultaneously therewith, the flag FL is rendered to be "1". If the flag FL is "1", a digital filtering calculation utilizing the numbers Pin(N), Pin(N−1) and Pout(N−1) of the pulses which are indicative of the length of tape remaining on the reel obtained at the steps (43) and (44) is carried out at a step (46) in the following manner to calculate the number Pout(N) of the pulses which are indicative of the length of tape remaining on the reel after the passage through the filter:

$$Pout(N) = a \cdot Pin(N) + b \cdot Pin(N-1) + c \cdot Pout(N-1) \qquad (2).$$

It is to be noted that a, b and c referred to above represent constants and by suitably selecting these constants, the desired filtering characteristics can be obtained. It is also to be noted that, if a=1 and b=c=0, Pout(N)=Pin(N). Therefore, this situation is the same as the situation in which no filter exists, and the calculation of the remaining length of tape is performed as in the conventional system. The structure of the filter necessary to perform the above described calculation is illustrated in block representation by FIG. 2.

Figure 2:
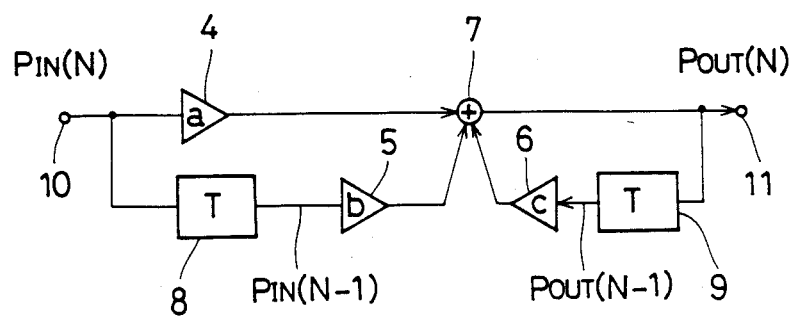
FIG. 2 is a block diagram illustrating the construction of a digital filter.

Referring to FIG. 2, constant multipliers 4, 5 and 6 are respectively provided. An adder 7, delay devices 8 and 9, and input terminal 10 for receiving the number Pin(N) of the pulses, which is indicative of the length of tape remaining on the reel, before the passage through the filter, and an output terminal 11 from which the number Pout(N) of the pulses indicative of the length of tape remaining on the reel after the passage through the filter are further provided as illustrated in FIG. 2.

A step (50) calculates the length T of time which is descriptive of the remaining length of tape from the number Pout(N) of the pulses indicative of the length of tape remaining on the reel. When FL=1, the length T can be calculated at a step (51) by the following equation:

$$T = C \cdot Pout(N) + D \cdot [Pout(N)]2 \qquad (3).$$

It is to be noted that C and D represent constants calculated in consideration of the thickness of the tape, the hub diameter of the reel, the tape transport speed, the number of pulses per rotation of the reel, etc.

A step (60) causes the display unit 2, to display the length of time, which is descriptive of the remaining length of tape, when a remaining tape length display command is inputted. When the flag FL is "1", the length T of time determined at the step (51) is displayed at a step (61). When the flag FL is "0", a display indicates that the measurement of the remaining length is impossible at a step (62).

A step (70) is a process performed by the microcomputer other than the calculation of the remaining length of the tape and a display thereof, such as receiving keyed inputs for example.

Accordingly, when the constant transportation continues, the number Pout(N) of the pulses indicative of the length of tape remaining on the reel which has passed through the digital filter can be calculated by the steps (40), (41), (42), (43), (44) and (46). As the constant transportation continues, the accuracy is increased by the filtering effect. In other words, as can be best understood from equation (2), since the correlation with the past data is taken from time to time in order to determine the remaining length, the accuracy of the calculation is improved.

Figure 4:
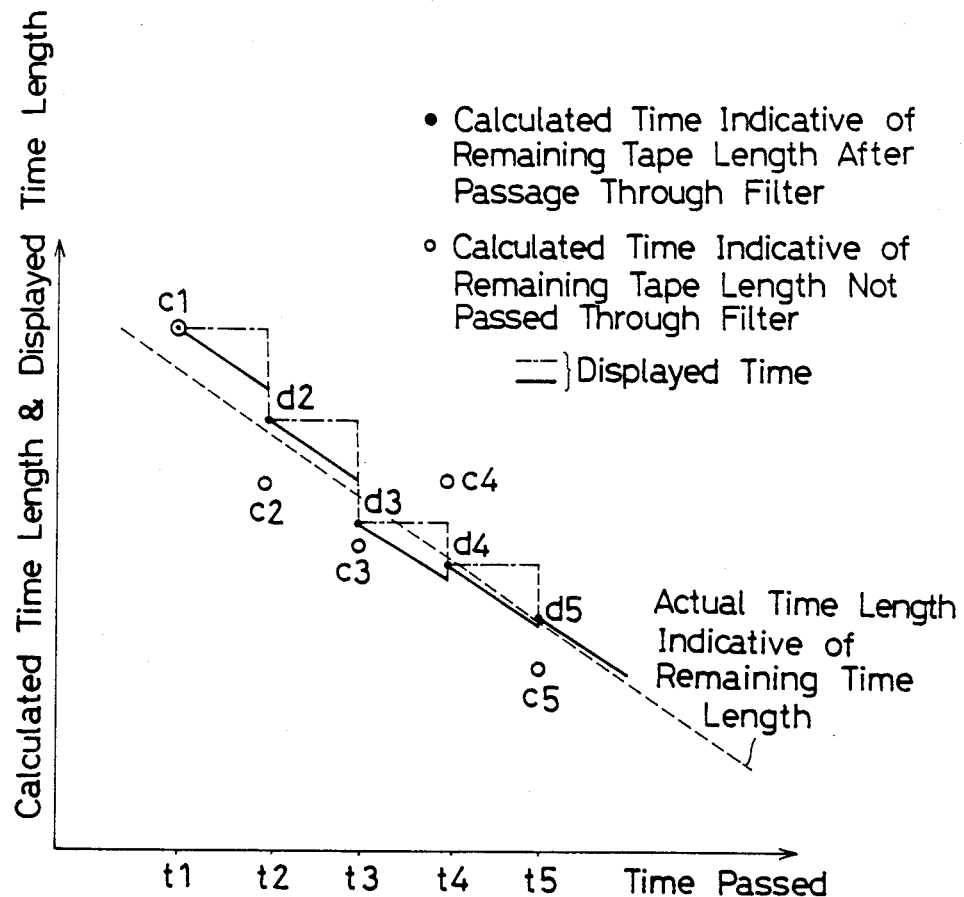
FIG. 4 is a diagram illustrating the relationship of the calculated value and the displayed value of both of the length of time which is descriptive of the remaining length of tape and the displayed value relative to the passage of time according to an embodiment of the present invention.
Figure 5:
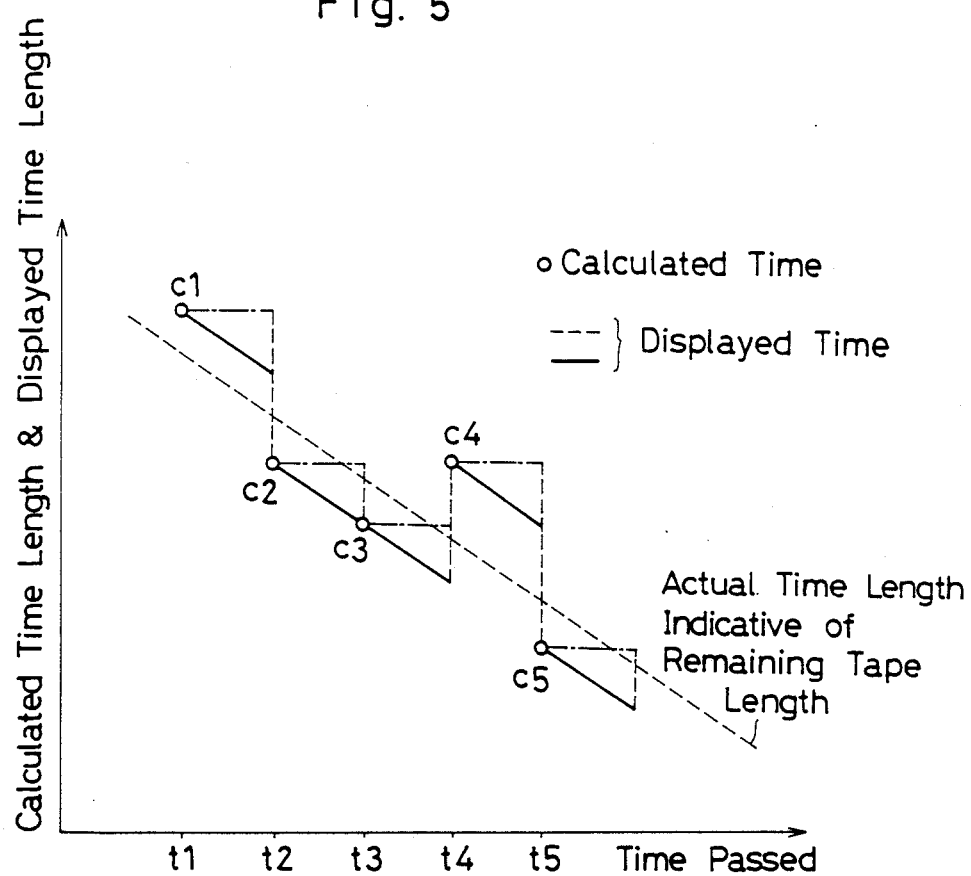
FIG. 5 is a diagram illustrating the relationship of the calculated value and the displayed value of both of the length of time which is descriptive of the remaining length of tape and the displayed value relative to the passage of time according to the conventional tape remaining time display system.

The relationship of the length of time, which is indicative of the remaining length and has been calculated without having been passed through the filter, with the displayed value of the length of time, which is indicative of the remaining length and has been calculated after being passed through the filter, in accordance to the passage of time is illustrated in FIG. 4. In FIG. 4, there is illustrated the case when $a=b=c=\frac{1}{3}$ for the display wherein the calculated lengths of time d1, d2 (indicative of the remaining length) which are improved as compared with the lengths of time C1 and C2 (indicative of the remaining length) calculated according to the conventional system are illustrated.

It is to be noted that, although in the foregoing embodiment, the structure of the digital filter has been described as performing the following calculation:

$$Pout(N) = a \cdot Pin(N) + b \cdot Pin(N-1) + c \cdot Pout(N-1);$$

the digital filter may have any suitable structure provided that the desired characteristics can be obtained. For example, if the digital filter is structured to represent a high-order digital filter utilizing $Pin(N-2)$, $Pin(N-3)$ . . . , a highly precise tape remaining time display system can be realized even though the capacity of the random access memory and the read-only memory will be required to be large.

The present invention can be adopted for the display of a tape remaining time for the length of magnetic tape used in a magnetic recording apparatus. For example, the present invention may be adopted for use in a video tape recorder, an audio tape recorded, or any other device such as a data recorder, etc.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A method for displaying a tape remaining time which is calculated from a detected cycle of the rotation of a tape supply-side reel, comprising the steps of:
    (a) detecting a cycle of rotation of the supply-side reel;
    (b) calculating a newly calculated tape remaining time in response to the cycle of rotation detected at said step (a);
    (c) developing a newly filtered tape remaining time in accordance with said newly calculated tape remaining time;
    (d) delaying said newly calculated tape remaining time for an amount of time corresponding to the cycle of rotation detected at said step (a) in order to obtain a previous tape remaining time;
    (e) delaying said newly filtered tape remaining time for an amount of time corresponding to the cycle of rotation detected at said step (a) in order to obtain a previous filtered tape remaining time; and
    (f) calculating the tape remaining time from the correlation between said newly calculated tape remaining time and said previous calculated tape remaining time.

2. A method for displaying a tape remaining time in response to a precalculated value which corresponds to the tape remaining time, the precalculated value being calculated from a detected cycle of a rotation of a tape supply-side reel, comprising the steps of:
    (a) detecting a cycle of rotation of the tape supply-side reel;
    (b) obtaining a newly obtained precalculated value in response to said step (a);
    (c) developing a newly filtered precalculated value in accordance with said newly obtained precalculated value;
    (d) delaying said new obtained precalculated value for an amount of time corresponding to the cycle of rotation detected at said step (a) in order to obtain a previous precalculated value;
    (e) delaying said newly filtered precalculated value for an amount of time corresponding to the cycle of rotation detected at said step (a) in order to obtain previous filtered precalculated value; and
    (f) calculating the precalculated value from the correlation between said newly obtained precalculated value and said previous precalculated value.

3. A method for displaying a tape remaining time as claimed in claim 2, wherein said precalculated value comprises the number of pulses which is representative of the length of the remaining tape on the supply-side reel.

4. A method for displaying a tape remaining time as claimed in claim 3, wherein the number of pulses which is representative of the length of the remaining tape on the supply-side reel is calculated according to:

$$P = A \cdot fs - B;$$

wherein P is the number of pulses, fs is the cycle of one rotation of the supply-side reel and A and B are constants corresponding to parameters of the supply-side reel and tape.

5. A method for displaying a tape remaining time as claimed in claim 4, wherein the tape remaining time is calculated according to:

$$T = C \cdot P + D \cdot P;$$

wherein T is the tape remaining time and C and D are constants corresponding to parameters of the supply-side reel and tape.

* * * * *